United States Patent [19]

Smolinske et al.

[11] Patent Number: 5,487,068
[45] Date of Patent: Jan. 23, 1996

[54] METHOD FOR PROVIDING ERROR CORRECTION USING SELECTIVE AUTOMATIC REPEAT REQUESTS IN A PACKET-SWITCHED COMMUNICATION SYSTEM

[75] Inventors: Jeffrey C. Smolinske, Hoffman Estates; Phieu M. Tran, Lincolnwood; Christopher L. Clanton, Chicago; Robert C. Scheibel, Jr., Schaumburg, all of Ill.

[73] Assignee: Motorola, Inc., Schaumburg, Ill.

[21] Appl. No.: 283,085

[22] Filed: Jul. 29, 1994

[51] Int. Cl.$^6$ ............................................. H04L 1/16
[52] U.S. Cl. ........................ 370/94.1; 370/95.2; 371/32
[58] Field of Search ................................. 370/95.1, 85.1, 370/95.2, 85.2, 95.3, 85.3, 94.1, 85.7, 118, 85.8, 104.1, 93, 94.2, 82; 455/58.2, 33.1, 33.2, 33.3; 371/35, 32; 375/111, 362; 379/59, 60

[56] References Cited

U.S. PATENT DOCUMENTS 5,231,634  7/1993  Giles et al. ............................ 370/95.1
5,301,194  4/1994  Seta ....................................... 370/95.1
5,349,582  9/1994  Bisdikian et al. ..................... 370/95.1

OTHER PUBLICATIONS

William Stallings, Handbook of Computer–Communications Standards, vol. 1, The Open Systems Interconnection (OSI) Model and OSI-Related Standards, MacMillan Publishing Company, New York.

Primary Examiner—Benedict V. Safourek
Assistant Examiner—Dang Ton
Attorney, Agent, or Firm—Darleen J. Stockley

[57] ABSTRACT

The method reduces transmission delay by using a selective-repeat automatic repeat request, ARQ, error detection scheme in a packet-switched data communication system. The invention provides a method for a subscriber unit to transmit acknowledgment information using a contention-free channel access scheme in addition to providing for a base site control unit to interrupt a packet currently being transmitted in order to retransmit segments of the packet when the segments have errors.

4 Claims, 3 Drawing Sheets

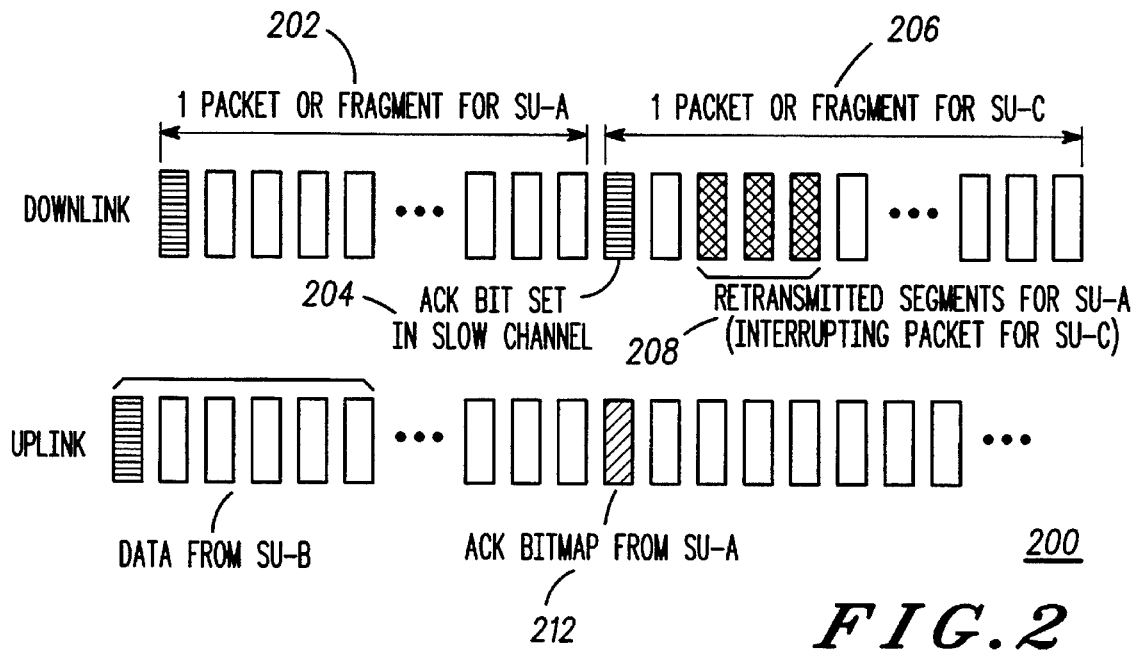
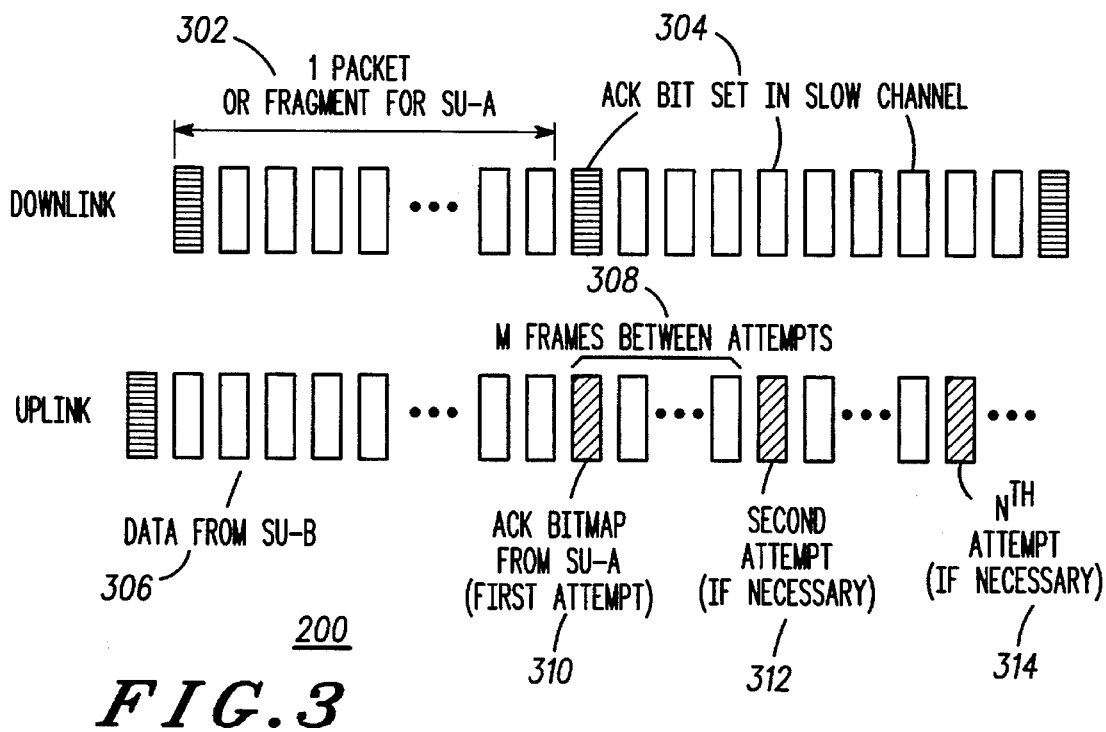

5,487,068

METHOD FOR PROVIDING ERROR CORRECTION USING SELECTIVE AUTOMATIC REPEAT REQUESTS IN A PACKET-SWITCHED COMMUNICATION SYSTEM

FIELD OF THE INVENTION

The present invention relates generally to data transmission in a packet-switched communication system and, more particularly, to error correction in a packet-switched communication system.

BACKGROUND

In time-division multiple access (TDMA) packet-switched communication systems, data from many different subscriber units is divided into units called packets and transmitted over a common channel. Each packet may be divided to form segments. Each segment occupies a discrete time slot of T seconds within a frame. A frame is made up of n of these time slots. Thus, subscriber units can communicate with each other on a basis of non-overlapping transmission bursts. Since there is no overlap, a same carrier frequency may be assigned to all subscriber units using a same base site.

The TDMA technique is characterized by duration of the time frame and the time slot within the frame. Each time slot typically consists of a guard time, a preamble, and the information to be transmitted. Typically, the preamble contains system information such as synchronization, control and routing information. The guard time and the preamble generally depend on the organization of the system. The information to be transmitted occupies a predetermined number of bits. Generally, some packets may be lost or garbled during transmission. When error detection followed by retransmission of select packets is used to correct errors, there is time delay in addition to total packet delay Thus, there is a need for an efficient method of error detection/error correction in a packet-switched data communication network.

BRIEF DESCRIPTION OF THE DRAWINGS

FIG. 2 is a schematic diagram of a first embodiment of the structure of uplink packets/fragments showing the acknowledgment structure in accordance with the present invention.

FIG. 3 is a schematic diagram of a second embodiment of the structure of uplink packets fragments showing the acknowledgment structure in accordance with the present invention.

DETAILED DESCRIPTION OF A PREFERRED EMBODIMENT

The present invention provides a method for a subscriber unit to transmit acknowledgment information in a packet-switched data communication system using a contention-free channel access scheme in addition to providing for a base site control unit to interrupt a packet currently being transmitted in order to retransmit segments of the packet when the segments have errors.

In packet-switched systems, on an uplink transmission a subscriber unit must contend or request access to a channel, involving inherent delay. Generally, many communication systems use a selective-repeat ARQ scheme to provide reliable packet-level communication. In order to retransmit data not correctly received by the base site, a subscriber unit must also contend or request access to the channel, thereby adding additional delay. The present invention provides a method for significantly reducing this delay.

Figure 1:
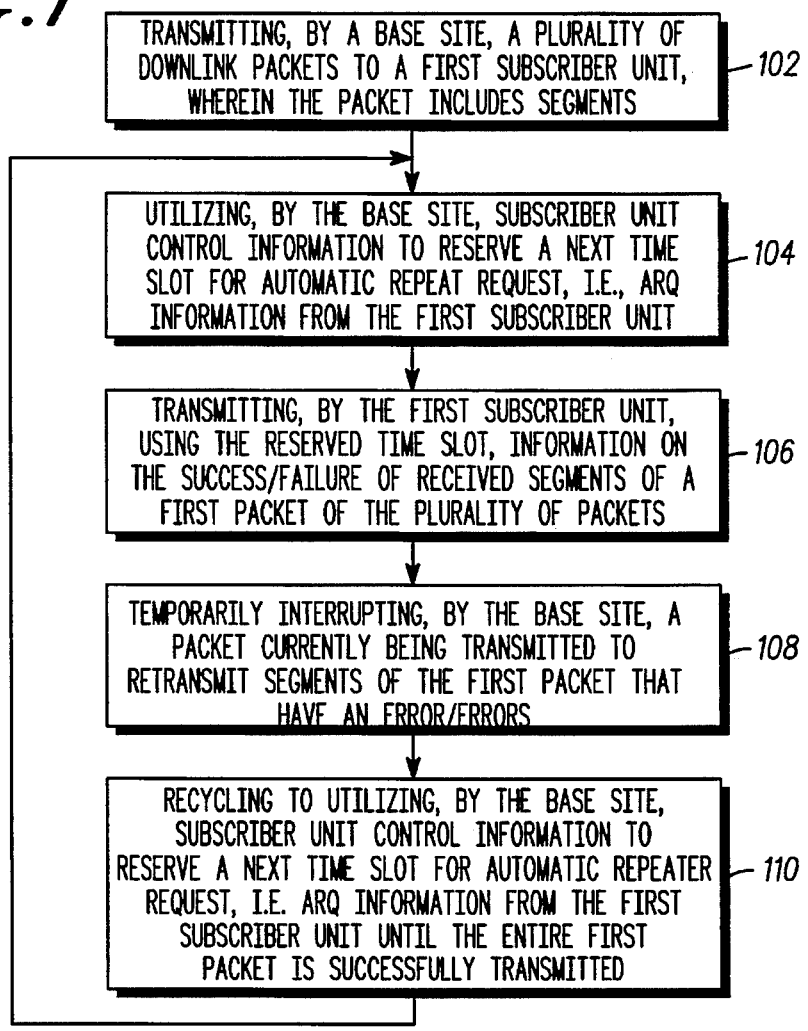
FIG. 1 is a flow chart showing steps for a method for providing a contention-free uplink access for a subscriber unit for transmission of predetermined types of messages in a slotted communication system in accordance with the present invention.

FIG. 1, numeral 100, is a flow chart showing steps for a method for providing a contention-free access uplink channel for a subscriber unit for transmission of predetermined types of messages in a slotted communication system in accordance with the present invention. The method includes the steps of: A) transmitting, by a base site, a plurality of downlink packets to a first subscriber unit, wherein the packet includes segments (102); B) utilizing, by the base site, subscriber unit control information to reserve a next time slot for automatic repeat request, i.e., ARQ, information from the first subscriber unit (104); C) transmitting, by the first subscriber unit, using the reserved time slot, information on the success failure of received segments of a first packet of the plurality of packets (106); D) temporarily interrupting, by the base site, a packet currently being transmitted to retransmit segments of the first packet that have an error/errors (108); and E) recycling to step B until the entire first packet is successfully transmitted (110). Where selected, step C, i.e., the step of transmitting, by the first subscriber unit, using the reserved time slot, information on the success/failure of received segments of a first packet of the plurality of packet, may include halting transmission by another subscriber unit to allow transmission by the first subscriber unit.

FIG. 2, numeral 200, is a schematic diagram of a first embodiment of the structure of uplink packets/fragments showing the acknowledgment structure in accordance with the present invention. A slow channel is typically a small portion of a time slot which carries the control information such as time slot usage, echo bits, access type. A fast channel is a larger portion of the time slot which carries mostly user data. A devoted out-of-band signaling channel such as the slow channel in a Personal Communications System, for example the PACS, i.e., Personal Access Communication System, may be selected to be used for transmitting the control information. An in-band signaling channel such as the fast channel in PACS may be used for transmission of user data. PACS supports a 10-bit per time slot slow channel structure. On a downlink transmission, the base site transmits a packet to subscriber unit A (202), SU-A, while subscriber unit B, SU-B, is transmitting another packet on an uplink channel (210). When the packet on the downlink channel has been completely transmitted, the base site control unit sets an acknowledgment bit, ACK (204), in the slow channel to notify all subscriber units that a current time slot is reserved for SU-A to transmit ARQ information. SU-A transmits information on the success/failure of receiving packet segments (212), and SU-B suspends the transmission of packets during transmission of the SU-A success/failure information. When the success/failure information for SU-A has been transmitted to the base site successfully, the base site retransmits SU-A segments that were received with an error/errors immediately on the downlink channel (208), interrupting any packet currently being transmitted on the downlink channel.

FIG. 3, numeral 300, is a schematic diagram of a second embodiment of the structure of uplink packets/fragments showing the acknowledgment structure in accordance with the present invention. The base site transmits a plurality of packets or fragments on a downlink channel to a first subscriber unit SU-A (302). In this embodiment, when the first packet of the plurality of packets has been received by the subscriber unit, the base site control unit signals a base site that a subscriber unit needs to transmit automatic repeat request, ARQ, information, and the base site sets a plurality of acknowledgment bits in the slow channel (304) to notify all subscriber units that a current time slot is reserved for SU-A to transmit ARQ information. SU-A transmits information in at least a first acknowledge, ACK, bitmap, on the success/failure of receiving packet segments (310, 312, 314, . . . ), and SU-B suspends the transmission of packets during transmission of the SU-A success/failure information (306). The base site then allocates time slots to allow the subscriber unit up to N, N a predetermined positive integer, attempts (310, 312, 314) to transmit the ARQ information, thus minimizing the probability that the information identified by the ARQ will be lost. The base site sets a MODE equal to ACK_MODE when the base site control unit sends the request for ARQ information, e.g., a slot of data with the ACK bit is set to 1. While in the ACK_MODE, the base site reserves every Mth time slot, M a predetermined positive integer, for ARQ information. The base site remains in the ACK_MODE until either the ARQ information is received correctly, or N time slots have been reserved for ARQ information, and, upon occurrence of either event, the MODE is set to INFO_MODE, where the base site stops reserving time slots for ARQ purposes. The base site control unit begins retransmitting segments as soon as one of the ARQ segments is successfully transmitted.

Figure 4:
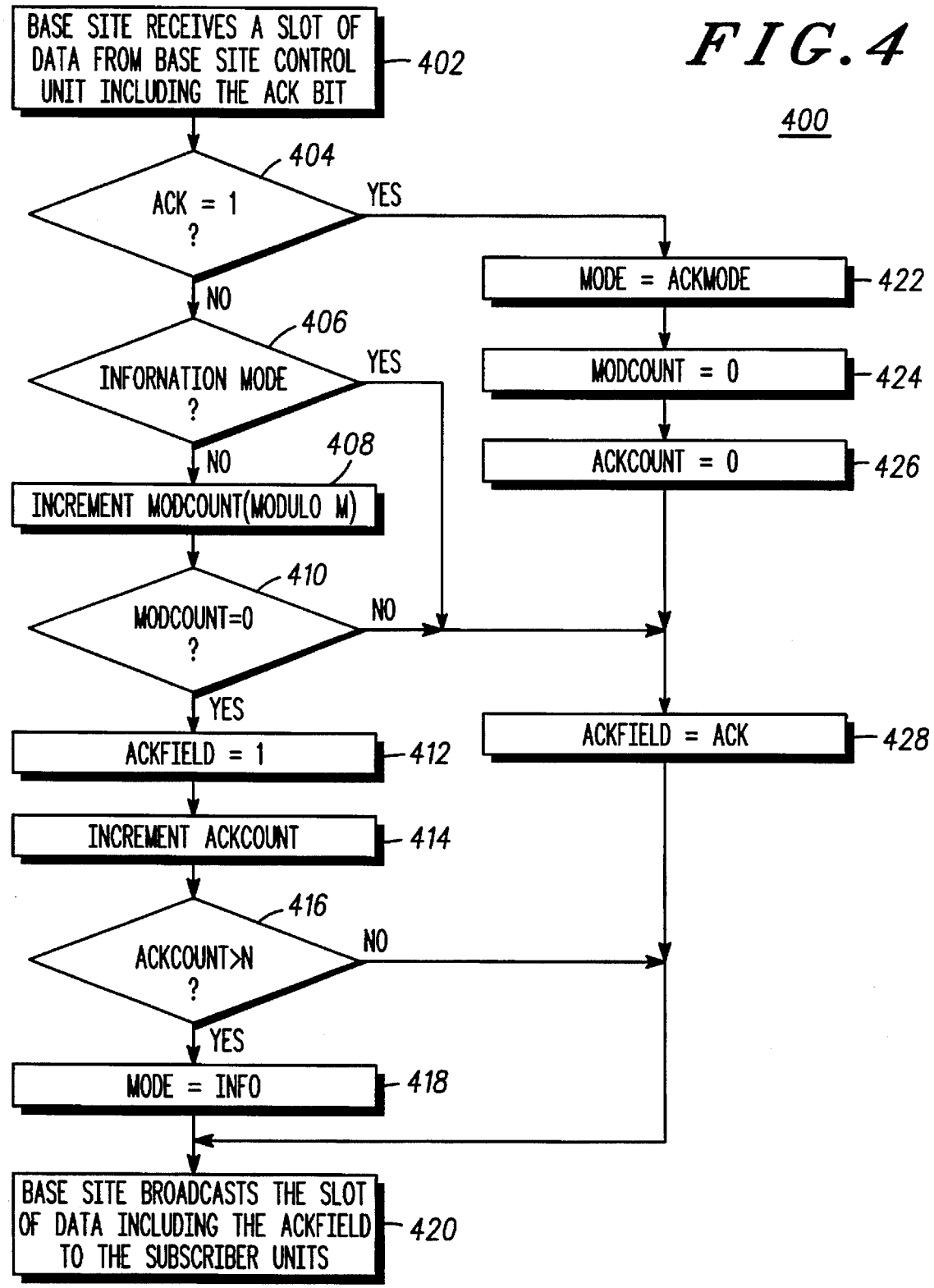
FIG. 4 is a flow chart showing the steps of a method for utilizing downlink channel processing at a base site for providing a contention-free uplink access channel for a first subscriber unit of a plurality of subscriber units for transmission of predetermined types of messages in a slotted communication system in accordance with the present invention.

FIG. 4, numeral 400, is a flow chart showing the steps of a method for utilizing downlink channel processing at a base site for providing a contention-free uplink access channel for a first subscriber unit of a plurality of subscriber units for transmission of predetermined types of messages in a slotted communication system in accordance with the present invention. The method includes the steps of: A) receiving, by a base site, a time slot of data from a base site control unit wherein the time slot of data includes at least a first acknowledgment bit (402); B) determining, by the base site, whether the at least first acknowledgment bit indicates that the channel is reserved for transmission by the first subscriber unit (404); C) where the at least first acknowledgment bit indicates that the channel is unreserved for transmission by the first subscriber unit, determining whether a mode is set to information mode (406); D) where the mode is set to information mode, setting an acknowledgment field to acknowledgment (428), broadcasting, by the base site, the slot of data including the acknowledgment field to the plurality of subscriber units, and stopping processing (420); E) where the mode is set to an acknowledgment mode, incrementing a modulo count (408) and determining whether the modulo count is equal to zero (410); F) where the modulo count is unequal to zero, setting the acknowledgment field to acknowledgment (428), broadcasting, by the base site, the slot of data including the acknowledgment field to the plurality of subscriber units, and stopping processing (420); G) where the modulo count is equal to zero, setting the acknowledgment field to indicate that the base site control unit has sent an automatic repeat request (412) and incrementing an acknowledgment count (414); H) determining whether the acknowledgment count is greater than a predetermined integer N (416); I) where the acknowledgment count is less than or equal to N, broadcasting, by the base site, the slot of data including the acknowledgment field to the plurality of subscriber units, and stopping processing (420); J) where the acknowledgment count is greater than N, setting a mode equal to INFO_MODE (418) and broadcasting, by the base site, the slot of data including the acknowledgment field to the plurality of subscriber units, and stopping processing (420); and K) where the at least first acknowledgment bit indicates that a time slot is reserved for transmission by the first subscriber unit, setting the mode to acknowledgment mode (422), setting the modulo count to zero (424), setting the acknowledgment count equal to zero (426), setting the acknowledgment field to acknowledgment (428) and broadcasting, by the base site, the slot of data including the acknowledgment field to the plurality of subscriber units, and stopping processing (420).

Figure 5:
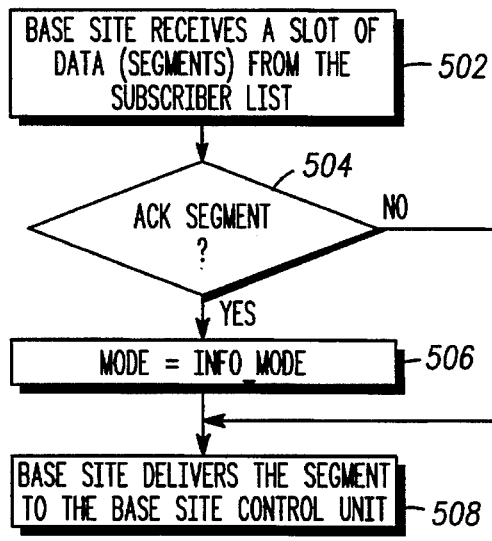
FIG. 5 is a flow chart showing steps for a method for utilizing uplink channel processing at a base site for providing a contention-free uplink access channel for a first subscriber unit of a plurality of subscriber units for transmission of predetermined types of messages in a slotted communication system in accordance with the present invention.

FIG. 5, numeral 500, is a flow chart showing steps for a method for utilizing uplink channel processing at a base site for providing a contention-free access uplink channel for a first subscriber unit of a plurality of subscriber units for transmission of predetermined types of messages in a slotted communication system in accordance with the present invention. The method includes the steps of: A) receiving, by a base site, a time slot of data from a subscriber unit wherein the time slot of data includes at least a first acknowledgment bit (502); B) determining, by the base site, whether the time slot of data includes an acknowledgment segment (504); C) where the time slot of data lacks an acknowledgment segment, transmitting, by the base site, the time slot of data to a base site control unit (508); and D) where the time slot of data includes an acknowledgment segment, setting a mode equal to an information mode (506) and transmitting, by the base site, the time slot of data to a base site control unit (508).

In another embodiment the acknowledgment information may include segment-level and packet-level information. Where all segments are received correctly, but the packet as a whole has an error, the base site control unit retransmits the entire packet.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for providing a contention-free access uplink channel for a subscriber unit for transmission of predetermined types of messages in a slotted communication system, comprising the steps of:

A) transmitting, by a base site, a plurality of downlink packets to a first subscriber unit, wherein a packet includes segments;

B) utilizing, by the base site, subscriber unit control information to reserve a next time slot for automatic repeat request information from the first subscriber unit;

C) transmitting, by the first subscriber unit, using the reserved time slot, information on the success/failure of received segments of a first packet of the plurality of packets;

D) temporarily interrupting, by the base site, a packet currently being transmitted to retransmit segments of the first packet that have an error/errors; and E) recycling to step B until the entire first packet is successfully transmitted.

2. The method of claim 1 wherein the step of transmitting, by the first subscriber unit, using the reserved time slot, information on the success/failure of received segments of a first packet of the actuality of packet further includes halting transmission by another subscriber unit to allow transmission by the first subscriber unit.

3. A method for utilizing downlink channel processing at a base site for providing a contention-free access uplink channel for a first subscriber unit of a plurality of subscriber units for transmission of predetermined types of messages in a slotted communication system, comprising the steps of:

A) receiving, by a base site, a time slot of data from a base site control unit wherein the time slot of data includes at least a first acknowledgment bit;

B) determining whether the at least first acknowledgment bit indicates that the channel is reserved for transmission by the first subscriber unit;

C) where the at least first acknowledgment bit indicates that the channel is unreserved for transmission by the first subscriber unit, determining whether bit(s) for a mode is/are set to information mode;

D) where the mode is set to information mode, setting an acknowledgment field to acknowledgment, broadcasting, by the base site, the slot of data including the acknowledgment field to the plurality of subscriber units, and stopping processing;

E) where the mode is set to an acknowledgment mode, incrementing a modulo count and determining whether the modulo count is equal to zero;

F) where the modulo count is unequal to zero, setting the acknowledgment field to acknowledgment, broadcasting, by the base site, the slot of data including the acknowledgment field to the plurality of subscriber units, and stopping processing;

G) where the modulo count is equal to zero, setting the acknowledgment field to indicate that the base site control unit has sent an automatic repeat request and incrementing an acknowledgment count;

H) determining whether the acknowledgment count is greater than a predetermined integer N;

I) where the acknowledgment count is less than or equal to N, broadcasting, by the base site, the slot of data including the acknowledgment field to the plurality of subscriber units, and stopping processing;

J) where the acknowledgment count is greater than N, setting a mode equal to INFO_MODE and broadcasting, by the base site, the slot of data including the acknowledgment field to the plurality of subscriber units, and stopping processing; and K) where the at least first acknowledgment bit indicates that a time slot is reserved for transmission by the first subscriber unit, setting the mode to acknowledgment mode, setting the modulo count to zero, setting the acknowledgment count equal to zero, setting the acknowledgment field to acknowledgment and broadcasting, by the base site, the slot of data including the acknowledgment field to the plurality of subscriber units, and stopping processing.

4. A method for utilizing uplink channel processing at a base site for providing a contention-free access uplink channel for a first subscriber unit of a plurality of subscriber units for transmission of predetermined types of messages in a slotted communication system, comprising the steps of:

A) receiving, by a base site, a time slot of data from a subscriber unit wherein the time slot of data includes at least a first acknowledgment bit;

B) determining, by the base site, whether the time slot of data includes an acknowledgment segment;

C) where the time slot of data lacks an acknowledgment segment, transmitting, by the base site, the time slot of data to a base site control unit; and D) where the time slot of data includes an acknowledgment segment, setting bit(s) for a mode equal to an information mode and transmitting, by the base site, the time slot of data to the base site control unit.

* * * * *